(12) United States Patent
Teo et al.

(10) Patent No.: US 7,549,210 B2
(45) Date of Patent: Jun. 23, 2009

(54) METHOD FOR MAKING A DATA STORAGE DEVICE

(75) Inventors: Joo Yong Teo, Singapore (SG); Niroot Jierapipatanakul, Singapore (SG); WaiOnn Chee, Singapore (SG); BoonSeng Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 257 days.

(21) Appl. No.: 10/949,677

(22) Filed: Sep. 24, 2004

(65) Prior Publication Data

US 2005/0060872 A1 Mar. 24, 2005

Related U.S. Application Data

(62) Division of application No. 10/326,790, filed on Dec. 20, 2002, now abandoned.

(60) Provisional application No. 60/383,035, filed on May 23, 2002.

(51) Int. Cl.
*H05K 7/14* (2006.01)
*G11B 33/04* (2006.01)

(52) U.S. Cl. .............. 29/603.03; 29/603.04; 360/264.7; 360/97.01; 360/266.4; 264/272.2; 361/685

(58) Field of Classification Search .............. 29/603.03, 29/603.01, 603.04; 360/264.1, 264.7, 264.8, 360/264.9, 266.4, 97.01; 361/685; 264/271.1, 264/257, 331.12, 331.13, 272.19, 272.2
See application file for complete search history.

(56) References Cited

U.S. PATENT DOCUMENTS

| 5,315,464 A | 5/1994 | Tsujino |
| 5,315,466 A | 5/1994 | Nishimoto et al. |
| 5,491,598 A | 2/1996 | Stricklin et al. |
| 5,532,889 A | 7/1996 | Stefansky et al. |
| 5,579,188 A | 11/1996 | Dunfield et al. |
| 5,585,981 A * | 12/1996 | Lee .......................... 360/264.7 |
| 5,600,516 A | 2/1997 | Phillips et al. |
| 5,636,091 A | 6/1997 | Asano |
| 5,694,268 A | 12/1997 | Dunfield et al. |
| 5,734,528 A | 3/1998 | Jabbari et al. |
| 5,751,514 A * | 5/1998 | Hyde et al. .............. 360/97.01 |
| 5,768,057 A | 6/1998 | Fernandes et al. |
| 5,949,613 A | 9/1999 | Moir et al. |
| 6,011,670 A | 1/2000 | Balsley et al. |
| 6,046,881 A | 4/2000 | Tielemans et al. |
| 6,125,016 A | 9/2000 | Lin |
| 6,175,469 B1 | 1/2001 | Ahmad et al. |

(Continued)

FOREIGN PATENT DOCUMENTS

JP 4-27531 * 1/1992

OTHER PUBLICATIONS

Chainer et al., "A Flexural In-Line Actuator for Magnetic Recording Disk Drives", IEEE Transactions on Magnetics, vol. 27, No. 6, Nov. 1991, pp. 5295-5297.*

*Primary Examiner*—A. Dexter Tugbang
(74) *Attorney, Agent, or Firm*—Fellers, Snider, et al.

(57) ABSTRACT

A data storage device is made by molding a portion of a motor into a first enclosure member, and then coupling the first enclosure member to a second enclosure member to define an interior environment for other data storage device components.

10 Claims, 5 Drawing Sheets

U.S. PATENT DOCUMENTS

| | | |
|---|---|---|
| 6,304,421 B1 | 10/2001 | Brown |
| 6,337,782 B1 | 1/2002 | Guerin et al. |
| 6,342,991 B1 | 1/2002 | Joshi et al. |
| 6,347,023 B1 | 2/2002 | Suwa |
| 6,577,474 B2 | 6/2003 | Kazmierczak et al. |

* cited by examiner (PRIOR ART)

FIG.1

(PRIOR ART)

METHOD FOR MAKING A DATA STORAGE DEVICE

RELATED APPLICATIONS

This application is a divisional application of U.S. patent application Ser. 10/326,790, filed Dec. 20, 2002, now abandoned, and claims priority from U.S. provisional application Ser. No. 60/383,035, filed May 23, 2002.

FIELD OF THE INVENTION

This application relates generally to magnetic disc drives, and more particularly to a disc drive having a molded top cover where a top pole of a voice coil motor assembly is over-molded within the molded top cover of the disc drive.

BACKGROUND OF THE INVENTION

Disc drives are data storage devices that store digital data in magnetic form on a rotating storage medium, such as a disc. Modem disc drives include a head disc assembly comprising one or more rigid discs that are coated with a magnetizable medium and mounted on the hub of a drive motor for rotation at a constant high speed. Disc drive components within the head disc assembly, such as the hub of the drive motor, an actuator assembly, and a voice coil motor, are mounted to a base plate. A top cover attaches to the base plate to internally seal the head disc assembly. Information is stored on the discs in a plurality of concentric circular tracks typically by an array of transducers ("heads") mounted to a radial actuator arm for movement of the heads relative to the discs. The read/write transducer, e.g. a magneto resistive read/write head, is used to transfer data between a desired track and an external environment. During a write operation, data is written onto the disc track and during a read operation the head senses the data previously written on the disc track and transfers the information to the external environment.

The voice coil motor assembly is part of the actuator assembly and operates to rotate the actuator arms and the attached read/write heads in an arcuate path over the respective disc surfaces. The voice coil motor assembly includes a coil and a magnetic circuit comprising one or more permanent magnet sets and magnetically permeable pole pieces. The coil is mounted on a rear portion of the actuator body opposite the actuator arms so as to be immersed in the magnetic field of the magnetic circuit. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about a pivot shaft so that the actuator arms and the attached heads move in an arc across the disc surfaces.

Typically, a magnetically permeable bottom pole is mounted to the base plate and a magnetically permeable top pole is either mounted to the inner surface of the top cover or is mounted to the bottom pole (via spacers or "standoffs") in spaced relation to both the bottom pole and the top cover. At least one permanent magnet set is positioned between and attached to one of the two poles. A gap between the magnet set and the opposite pole provides space for the coil to move in response to the application of varying DC signals to the coil.

Figure 1:
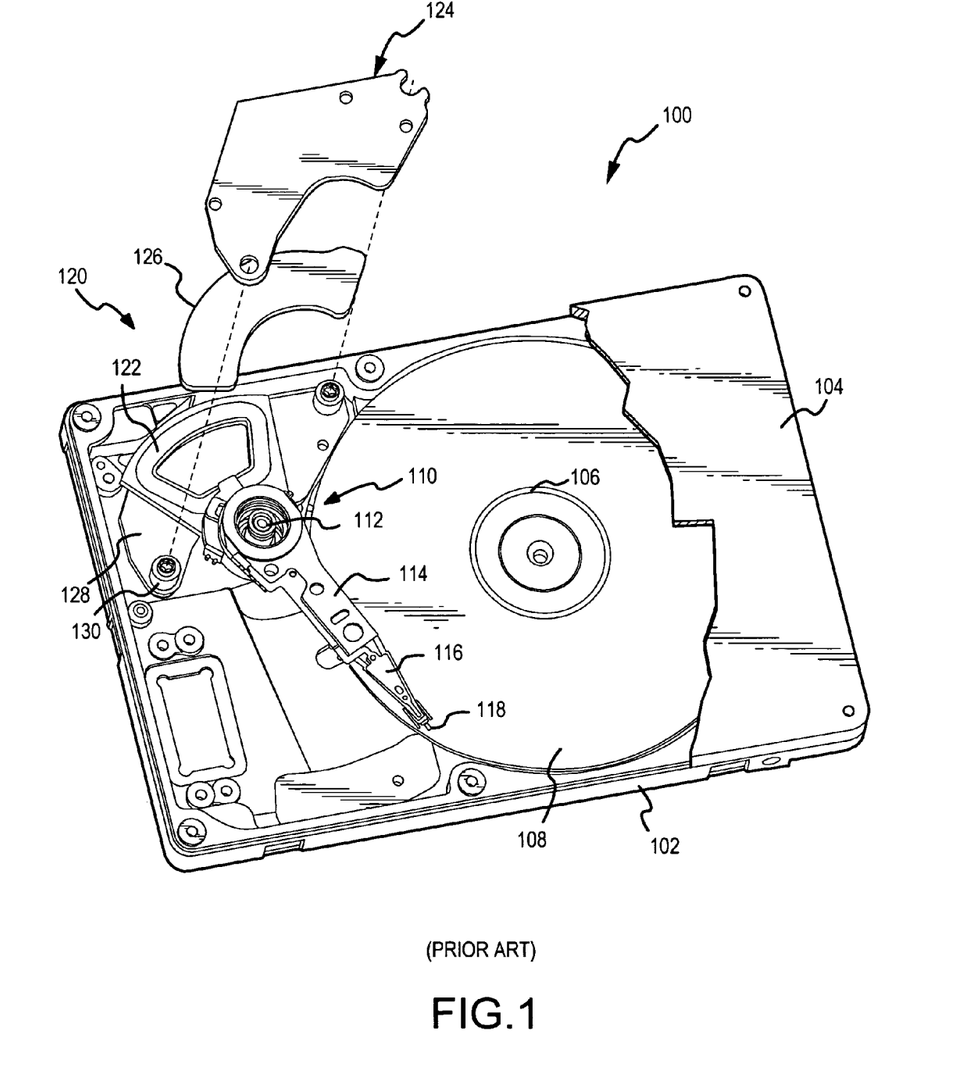
FIG. 1 is a partially exploded, perspective view of a disc drive showing a prior art voice coil motor assembly with a top pole and a magnet set illustrated exploded from the remainder of the voice coil motor assembly.

FIG. 1 shows a head disc assembly of a conventional disc drive 100 that uses the spacer method to position the top pole. The disc drive 100 includes a base plate 102 to which various components of the disc drive 100 are mounted. A top cover 104, shown partially cut away, cooperates with the base 102 to form an internal, sealed environment for the disc drive 100 in a conventional manner. The components include a drive motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) assembly 120, which typically includes a coil 122 attached to the actuator arm 114 on the opposite side of the bearing shaft assembly 112, a top pole 124, a magnet 126, and a bottom pole 128. The magnet 126 either defines a pair of magnets with opposite polarity lying in a common plane, or a single part with a transition zone between two faces of opposite polarity, so that the magnet establishes a magnetic field in which the coil 122 is immersed. The top pole 124 is attached in spaced relation to the bottom pole 128 with magnetically permeable standoffs or side posts 130. The controlled application of current to the coil 122 causes magnetic interaction between the permanent magnet sets 126 and the coil 122 so that the coil 122 moves in accordance with the well known Lorentz relationship. The top pole 124 and the bottom pole 128 provide a return path for the magnetic field passing through the coil 122. Furthermore, the standoffs or side posts 130 typically act together with the top and bottom poles 124 and 128 to form a closed magnetic field loop for the magnetic flux lines emanating from the magnet set 126. As the coil 122 moves, the actuator assembly 110 pivots about the bearing shaft assembly 112, and the heads 118 are caused to move across the surfaces of the discs 108.

Figure 2:
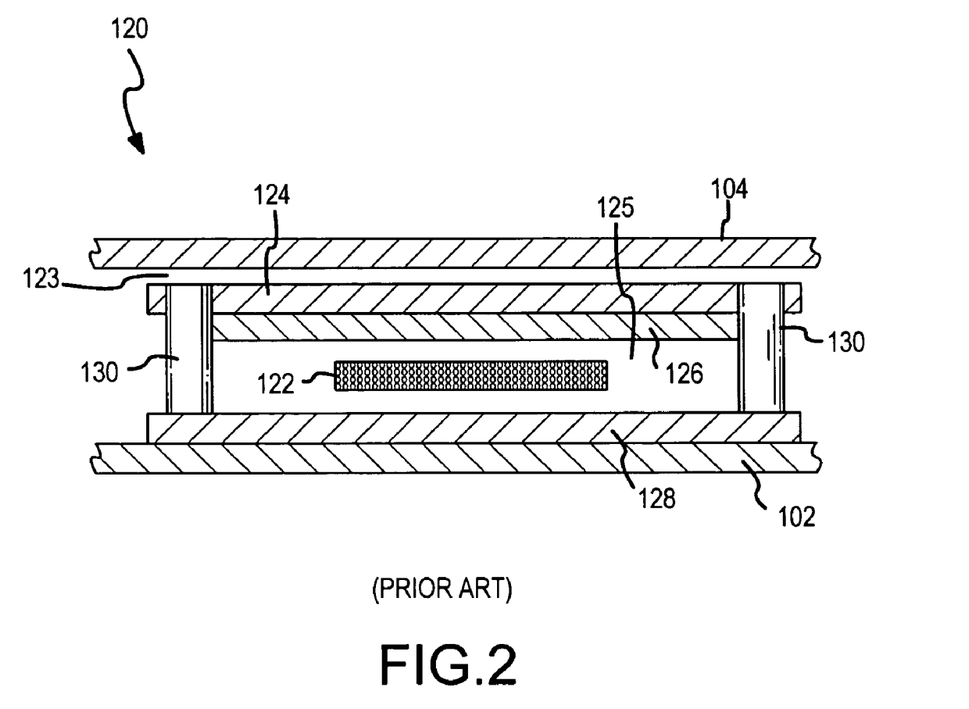
FIG. 2 is a generalized section view of the prior art voice coil motor assembly shown in FIG. 1.

FIG. 2 shows a generalized sectional view of the conventional voice coil motor 120 shown in FIG. 1. The bottom pole 128 is mounted to the base plate 102 by any conventional method, such as screws or an adhesive. The top pole 124 is mounted to the bottom pole 128, and thus to the base plate 102 via standoffs 130 such that the top pole 124 is spaced apart from the bottom pole 128. The top pole 124 and the top cover 104 typically form an air gap 123 therebetween. The permanent magnet set 126 is attached to the top pole 124 opposite the top cover 104. The coil 122 is attached to the actuator assembly (not shown) and positioned within an air gap 125 between the magnet set 126 and the bottom pole 128.

One of the problems with this conventional design is that the overall height of the disc drive 100 is fixed due to form factor limitations, and thus a portion of this limited space or "height" is wasted due to the inclusion of the air gap 123. A second problem with this conventional design is that it requires extra parts, such as standoffs 130, to both mount and properly position the top pole 124 within the head disc assembly. While the standoffs 130 help to maximize the magnetic field in the vicinity of the coil 122 by creating a closed magnetic path, it has been determined that the standoffs 130 tends to increase inductance within the windings of the coil 122. Increased inductance results in an increased resistance to a change in the current within the windings of the coil 122 and thus slower "seek" times for the voice coil motor 120. Specifically, the "seek" time of a disc drive 100 is the amount of time necessary to pivot the actuator assembly 110 so that the heads 118 move between different tracks on the discs 108. Because a quick change in current through the coil 122 is necessary for fast seek times, it is axiomatic that an increase in inductance within the coil results in slower seek times. In addition to adding to the complexity and cost of manufacturing a disc drive, a further problem with the standoffs 130 is that engineering tolerances in the manufacture of the standoffs can lead to variations in the magnetic fields produced by different voice coil motors 120

As noted above, one solution to the problem of the air gap 123 and the manufacturing complexity and expense of the standoffs 130 is to mount the top pole 124 directly to an inner surface of the top cover 104, such as by an adhesive or by welding the top pole 124 to the metallic cover 104. However, adhesives are expensive and may cause outgassing that can corrupt normal disc drive operation, while welding creates the potential for gaps to form between the two parts that may allow contaminants to be trapped and possibly escape to the interior of the head disc assembly. In any event, the process of attaching the top pole 124 to the top cover 104 requires extra manufacturing steps that increases the build time and thus the cost of a disc drive 100. A further difficulty with attaching the top pole 124 directly to the cover 104 is that modem top covers 104 are frequently formed with numerous recessed regions, cutouts and other features required to accommodate the different components within the drive 100. As a result, it is difficult to provide a smooth mounting surface on the inner surface of the top cover 104 for attaching to the top pole 124. Indeed, while a metal top cover 104 provides needed support for certain disc drive components such as the bearing shaft assembly 112, it is expensive to mold or stamp aluminum top covers 104 with the intricate shapes required by current disc drive designs.

Accordingly there is a need for a voice coil motor assembly that minimizes wasted space within the disc drive while reducing manufacturing costs by eliminating unnecessary parts and simplifying manufacturing steps. The present invention provides a solution to these and other problems, and offers other advantages over the prior art.

SUMMARY OF THE INVENTION

The present invention relates to a disc drive having a molded top cover that includes an embedded or "over-molded" top pole piece that cooperates with other components of a voice coil motor assembly attached to a base plate of the disc drive. The over-molded top pole piece minimizes wasted space within the interior of the drive and reduces the complexity and time required to assemble the voice coil motor assembly.

In accordance with one embodiment of the present invention, a disc drive has a base plate supporting a data storage disc and an actuator arm mounted adjacent the disc for positioning a transducer over the disc. A top cover attached to the base plate defines an internal environment of the disc drive, where the top cover is formed from a moldable material by an injection molding process and includes a metal top pole piece over-molded within the top cover. A voice coil motor assembly includes a voice coil attached to the actuator arm, a bottom pole mounted to the base plate, and a magnet attached to the bottom pole, wherein the coil is positioned adjacent to the permanent magnet between the bottom pole and the top pole piece over-molded within the top cover. In one embodiment, the moldable material is a polymer reinforced with carbon or steel fibers.

One embodiment of the metal top pole piece includes a pole body and a mounting surface extending from the pole body, wherein the mounting surface is secured to an actuator arm bearing shaft to provide a metallic anchor between the bearing shaft and the molded top cover. The metal top pole piece may also include an outer flange extending from the pole body, wherein the outer flange includes a hole aligned with an opening in the top cover to provide a reinforced contact point between the base plate and the molded top cover.

Connected in this manner, the over-molded metal top pole piece is fully supported by the top cover and is not directly connected to the bottom pole of the voice coil motor assembly. Additionally, the over-molded top pole piece does not extend within the internal environment of the disc drive.

The present invention can also be implemented as a top cover for a disc drive that includes a base plate supporting an actuator arm mounted adjacent a data storage disc and a voice coil motor assembly having a voice coil attached to the actuator arm, a bottom pole mounted to the base plate and a magnet attached to the bottom pole. The top cover includes a cover portion formed from a moldable material by an injection molding process, wherein the cover portion is adapted for attachment to the base plate to form an internal environment of the disc drive. A metal top pole piece is over-molded within the cover portion of the top cover during the injection molding process, and the metal top pole piece includes a pole body adapted to be aligned over the bottom pole of the voice coil motor assembly when the cover portion is attached to the base plate. In one embodiment, the moldable material is a polymer reinforced with fibers such as carbon or steel fibers.

One embodiment of the top cover includes a mounting surface extending from the pole body, wherein the mounting surface is over-molded within the cover portion and is adapted for attachment to a bearing shaft of the actuator arm to provide a metallic anchor between the bearing shaft and the cover portion. The top cover may also include an opening for attaching the cover portion to the base plate of the disc drive. An outer flange extending from the pole body of the metal top pole piece is also over-molded within the cover portion and includes a hole aligned with the opening in the cover portion to provide a reinforced contact point between the cover portion and the base plate.

The present invention can further be implemented as a disc drive having a base plate supporting an actuator arm mounted adjacent a data storage disc and a voice coil motor assembly having a voice coil attached to the actuator arm, a bottom pole mounted to the base plate and a magnet attached to the bottom pole. The disc drive includes a top cover attached to the base plate to define an internal environment of the disc drive, and means for supporting a top pole piece in alignment above the bottom pole of the voice coil motor assembly so that the top pole piece does not extend into the internal environment of the disc drive. In one embodiment, the means for supporting the top pole piece includes injection molding the top cover from a moldable material and over-molding the top pole piece within the top cover. In certain embodiments, the moldable material is a reinforced polymer.

These and various other features as well as advantages which characterize the present invention will be apparent from a reading of the following detailed description and a review of the associated drawings.

DETAILED DESCRIPTION

Figure 3:
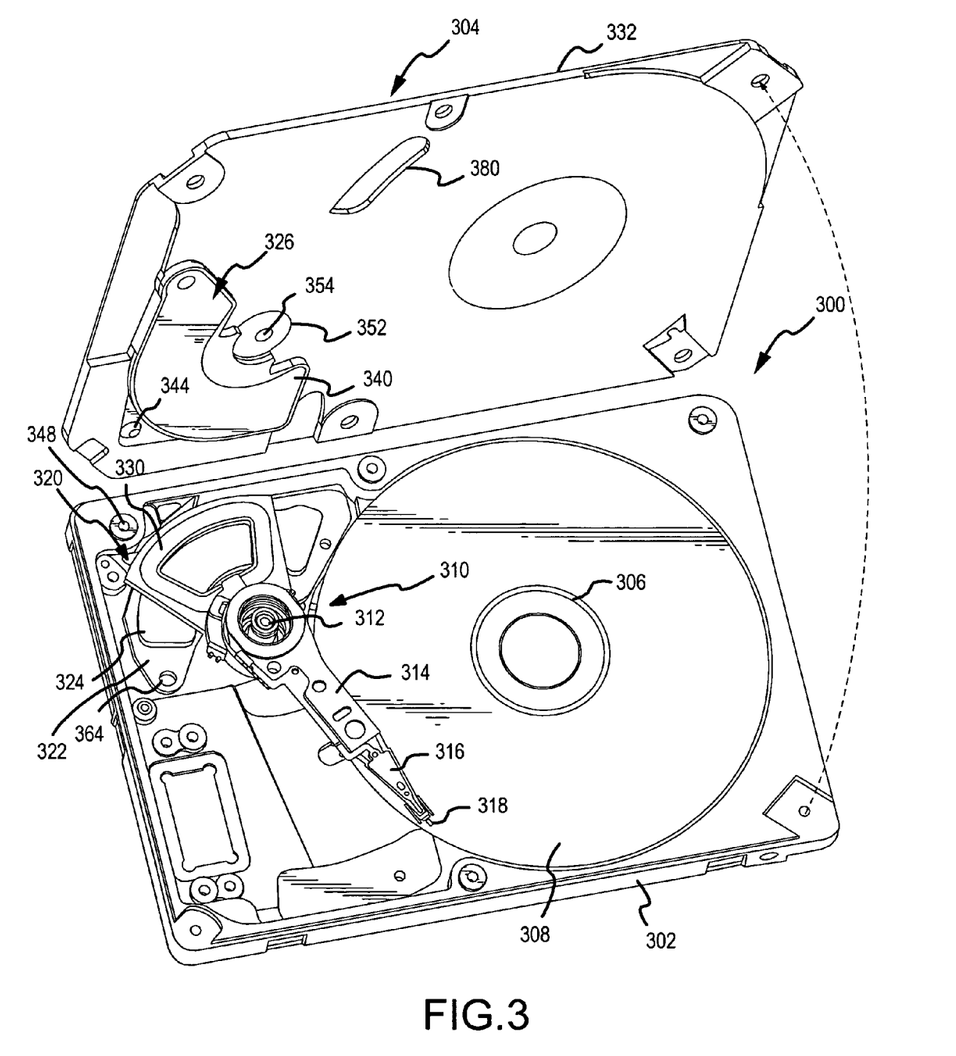
FIG. 3 is a perspective view of a disc drive illustrating a moldable top cover of the disc drive exploded from a base plate and a head disc assembly of the disc drive, and further illustrating a top pole of a voice coil motor assembly over-molded with the top cover in accordance with a preferred embodiment of the present invention.
Figure 4:
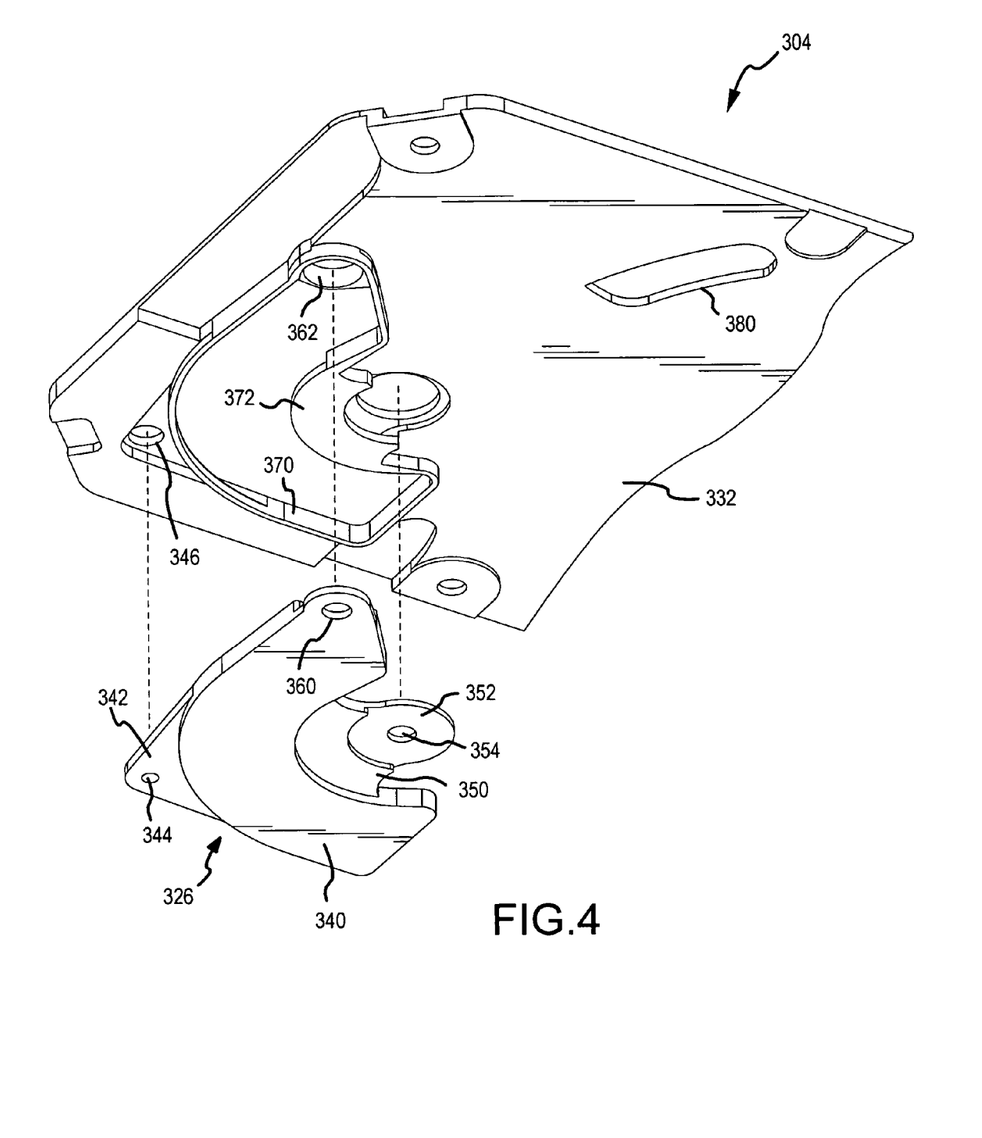
FIG. 4 is an enlarged perspective view of a portion of the moldable top cover shown in FIG. 3 illustrating the over-molded top pole of the present invention exploded away from the moldable top cover.
Figure 5:
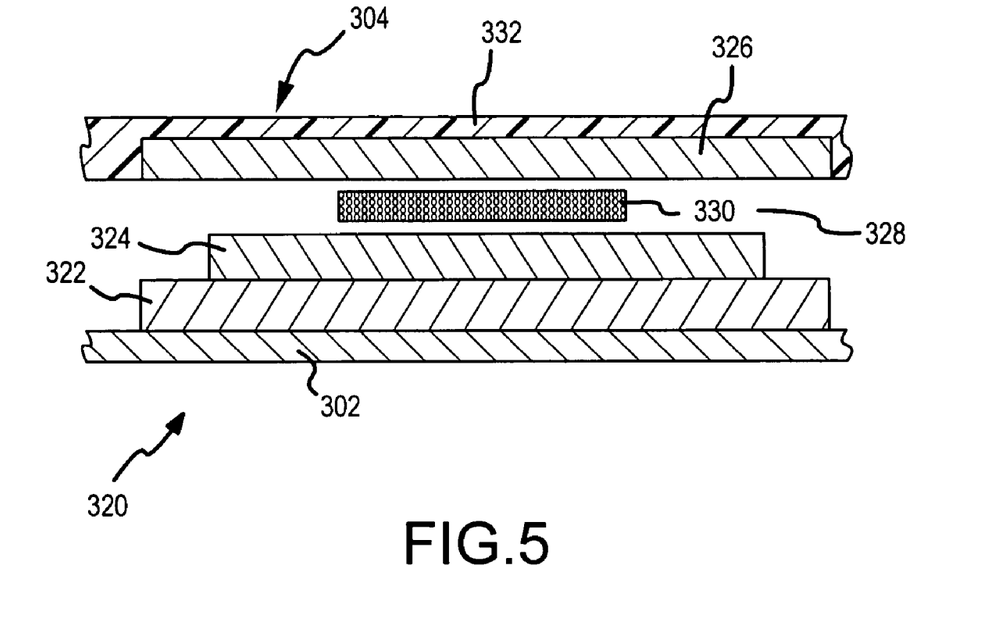
FIG. 5 is a is a generalized section view of the voice coil motor assembly shown in FIG. 3 illustrating the over-molded top pole formed integrally with a moldable top cover in accordance with a preferred embodiment of the present invention.

A preferred embodiment of the present invention is shown in FIGS. 3-5. A disc drive 300 (FIG. 3) includes a base plate 302 and a top cover 304 formed from a moldable material such as a reinforced polymer plastic. The top cover 304, described in greater detail below, connects to the base plate 302 to form an internal, sealed environment for the disc drive 300 similar to that shown in FIG. 1 above. The internal components of the drive 300 include a drive spindle motor 306 that rotates one or more discs 308, and an actuator assembly 310 that rotates about a bearing shaft 312 during a seek operation. The spindle motor 306 is preferably of a rotating shaft design that does not require a connection to the top cover 304 (as in the case of a stationary shaft design). The actuator assembly 310 includes a plurality of actuator arms 314 with one or more flexures 316 extending from each of the actuator arms 314 towards the discs 308. Read/write heads 318 mounted at the distal end of each of the flexures 316 include air bearing sliders enabling the heads 318 to fly in close proximity above the corresponding surface of the associated disc 308.

As noted above, the track position of the heads 318 is controlled during a seek operation through the use of a voice coil motor (VCM) assembly 320. In the preferred embodiment shown in FIG. 3, the VCM assembly 320 includes a bottom pole 322 that is fixed to the base plate 302 in a conventional manner, such as by adhesive or a threaded fastener (not shown). A magnet set 324 is preferably attached to a top surface of the bottom pole 322, where the magnet set 324 includes a pair of magnets with opposite polarity faces lying in a common plane. The magnet set 324 may be attached to the top surface of the bottom pole 322 by its own magnetic force or by a suitable adhesive.

The moldable top cover 304 is preferably formed integrally with a top pole 326 embedded or "over-molded" therein. In this manner, the top pole 326 is aligned over top of the magnet set 324 and the bottom pole 322 when the top cover 304 is attached to the base plate 302. Specifically, the top pole 326 is suspended above the magnet set 324 so as to leave an air gap 328 (FIG. 5) therebetween to allow for movement of a coil 330 within the magnetic field created by the magnet 324 and the top and bottom poles 326 and 322, respectively. The coil 330 is attached to the rear of the actuator assembly 310 in a conventional manner so that movement of the coil 330 (upon the application of direct current to the coil windings) causes the actuator arms 314 and the heads 318 to move in an arcuate path over the surfaces of the discs 308.

FIG. 4 is an exploded view illustrating the top pole 326 exploded away from the molded cover portion 332 of the top cover 304. In a preferred embodiment, the top cover 304 is molded from a reinforced polymer material (e.g., plastic reinforced with carbon or stainless steel fibers), although any moldable material may be used. For the purposes of the present invention, the term "moldable material" encompasses those materials that may be injection molded and which harden to form a sufficiently stiff cover portion 332 capable of sealing the drive 300 and protecting the internal disc drive components. The term "moldable material" does not encompass materials such as stainless steel or aluminum which are commonly used to form the base plate 302 as well as prior art top covers. The use of a moldable materials such as reinforced polymers for the top cover 304 represents an improvement over prior metal top covers in terms of both cost and manufacturing ease. Specifically, plastic molding techniques provide the ability to form more complex shapes than is possible with metal molding or stamping techniques. Furthermore, with respect to the present invention, plastic molding techniques provide the ability to embed or "over-mold" a metal part within the molded plastic body. Thus, the metal top pole piece 326 (preferably formed from stainless steel) may be inserted within a plastic mold prior to injecting the molten reinforced polymer within the mold so that the metal piece is surrounded or "over-molded" by the molten polymer material during the formation of the top cover 304. In a preferred embodiment, the cover portion 332 completely covers an upper portion of the top pole 326 so that a top surface of the over-molded top pole 326 does not protrude upward through a top surface of the top cover 304 (see the section view of the top cover 304 and the over-molded top pole 326 in FIG. 5).

FIG. 4 illustrates the complex shape of the preferred pole piece 326. Specifically, the pole piece 326 includes a pole body 340 defining the maximum thickness of the pole piece 326 (preferably 0.104 inches for a standard 3.5 inch form factor disc drive). The pole body 340 has a curved shape that matches the shape of the bottom pole 322 and the magnet set 324. An outer flange 342 extends from an outer circumference of the curved pole body 340 and preferably has a reduced thickness relative to the thickness of the pole body 340. The outer flange 342 preferably extends flush with a top surface of the pole body 340 to form a mounting hole 344 that aligns with a similar hole 346 formed in the molded top cover 304. The holes 344 and 346 in turn align with a threaded hole 348 (FIG. 3) formed in the base plate 302. The inclusion of the metal flange 342 and the mounting hole 344 allows a reinforced metal-to-metal contact at one corner of the joined metal base plate 302 and the molded (e.g., plastic) top cover 304. This metal-to-metal contact allows a threaded fastener (not shown) to make a more secure connection between the base plate 302 and the top cover 304.

The pole piece 326 also preferably includes an inner feature 350 extending from an inner circumference of the curved pole body 340. The inner feature 350 preferably has a reduced thickness relative to the thickness of the pole body 340 and includes a circular mounting surface 352 defining a mounting hole 354. The mounting hole 354 is aligned with the bearing shaft 312 of the actuator assembly 310 when the top cover 304 is attached to the base plate 302 and provides increased stiffness (i.e., a metal-to-metal contact) at the contact point between the top cover 304 and a top end of the bearing shaft 312. In this manner, the molded top cover 304 provides adequate support for the actuator assembly 310 similar to the level of support provided by prior art metal top covers (such as the aluminum or stainless steel top cover 104 shown in FIG. 1). Specifically, the metal inner feature 350 helps to anchor the bearing shaft 312 of the actuator assembly 310 to prevent the reduced stiffness of the molded top cover 304

(relative to the prior art metal top covers 104) from introducing vibrations or amplifying existing vibratory modes during operation of the actuator assembly 310.

While the outer flange 342 includes a mounting hole 344 for securing the top cover 304 to the base plate 302, the top pole piece 326 may also include a separate through hole 360 at one end of the curved pole body 340. As best shown in FIG. 4, the hole 360 aligns with a hole 362 formed in the molded top cover 304 and further aligns with a hole 364 formed in the bottom pole 322 beyond the end of the magnet 324. The aligned holes 362, 360 and 364 may receive a threaded fastener to further secure and position the top pole 326 relative to the bottom pole 322. However, in those cases where the reinforced polymer top cover 304 is sufficiently stiff, the holes 360, 362 and 364 may not be necessary to provide a sufficiently rigid connection between the elements of the voice coil motor assembly 320.

Molding the top cover 304 from a polymer (or other moldable) material provides a number of benefits over prior art aluminum or steel top covers 104. Initially, it has been found that forming the top cover 304 and the integral top pole piece 326 in a single molding step saves a significant amount of time (and thus money) over prior art manufacturing processes where the top cover 104 is formed separately and a top pole 124 is either attached to the top cover 104 (such as by an adhesive) or is connected directly to a bottom pole 128 by standoffs 130. With respect to prior art drives 100 where the top pole 124 is attached by an adhesive to the top cover 104, the present invention represents a major improvement by not incurring the costs or the potential outgassing hazards associated with the use of an adhesive. Indeed, it has been found that the use of a moldable top cover 304 with an over-molded top pole 326 provides a cost savings of approximately twenty percent over adhering a top pole to a metallic top cover. Furthermore, with respect to prior art drives that utilize standoffs 130 to support the top pole 124, the present invention provides additional cost savings (in both material and manufacturing steps) by not requiring separate standoffs 130 to support the top pole.

Furthermore, with respect to all such prior art voice coil motor assemblies where the top pole is attached within the internal environment of the drive, the present invention provides for a more powerful voice coil motor assembly 320 by embedding the top pole 326 within the top cover 304, thereby maximizing the remaining space within the interior of the disc drive 300. That is, for a given form factor, each disc drive has a limited amount of vertical space or "height" within which to house the components of the voice coil motor. Thus, by moving the top pole piece 326 out of the drive interior and embedding or "over-molding" the top pole within the top cover 304 itself, the present invention provides additional space within the drive interior to accommodate a larger magnet 324 and a larger bottom pole 322, as well as a larger coil 330 (compare the section view of FIG. 5 with the prior art section view of FIG. 2). The use of a larger magnet, coil and/or pole pieces in turn creates a stronger magnetic field that is capable of generating more torque and thus faster seek times for the disc drive 300.

Additionally, forming the top cover 304 from a moldable material such as a fiber reinforced polymer allows for the inclusion of intricate features within the top cover, such as retaining features used to accurately position and firmly hold the top pole 326 in place. Such intricate features are possible as a result of the injection molding process that is preferably used to form the top cover 304, and would not be possible with a stamped or poured aluminum top cover. For example, FIG. 4 illustrates a depending border 370 that surrounds and retains a perimeter of the curved pole body 340 while providing an opening to allow the outer flange 342 to extend above and beyond the border 370. Additionally, an expanded support surface 372 extends from an inner portion of the border 370 to support and retain the inner feature 350 of the top pole piece 326 so that the mounting hole 354 is properly aligned with the bearing shaft 312. Other features, such as a servo writing opening 380, are also easily formed within the moldable top cover 304 during the injection molding process.

As noted above, FIG. 5 provides a generalized sectional view of the disc drive 300 and illustrates the use of the relatively larger components, such as the bottom pole 322, the magnet 324 and the coil 330, which is possible due to the fact that the top pole 326 no longer takes up valuable space within the drive interior. FIG. 5 further illustrates the complete over-molding of the top pole 326 by the polymer top cover 304. As noted above, while a fiber reinforced polymer is preferably used to form the moldable cover 304, the present invention encompasses other moldable materials provided that the material is sufficiently rigid to protect the drive components while being sufficiently moldable (i.e., capable of injection molding) to form all of the required intricate features of the top cover 304.

Connected in this manner, the over-molded metal top pole piece is fully supported by the top cover and is not directly connected to the bottom pole of the voice coil motor assembly. The present invention thus simplifies the manufacturing process and reduces manufacturing costs (both in material and in assembly time) by eliminating the requirement for adhesives or side posts to support the top pole piece. Any loss of efficiency within the voice coil motor resulting from the lack of side posts connecting the top and bottom poles is compensated for by the increased size (and thus power) of the magnet and the coil that is made possible by removing the top pole piece from the internal environment of the disc drive.

Numerous other changes may be made which will readily suggest themselves to those skilled in the art and which are encompassed in the spirit of the invention disclosed and as defined in the appended claims.

What is claimed is:

1. A method for making a data storage device, comprising steps of:
   providing a motor having a first motor portion made entirely of a magnetic material and a second motor portion;
   making a first enclosure member by performing steps of:
      inserting the first motor portion in a mold; and
      molding a material about the first motor portion;
   coupling a second enclosure member to the first enclosure member so as to form an enclosure defining an interior environment of the data storage device, wherein the first motor portion comprises a planar surface exposed to the interior environment of the storage device, and wherein the material covers all surfaces of the first motor portion other than the planar surface.

2. The method of claim 1, in which the motor comprises a voice coil motor.

3. The method of claim 1, in which the first enclosure member comprises a top cover and the second enclosure member comprises a base.

4. The method of claim 1 in which the first motor portion comprises a first pole piece.

5. The method of claim 1, further comprising a step of mounting the second motor portion to the second enclosure member prior to the coupling step.

6. The method of claim 4, in which the second motor portion comprises:

a coil carried by the actuator;

a second pole piece mounted to the second enclosure member; and a magnet mounted to the second pole piece.

7. The method of claim 1 in which the molding step comprises injection molding a moldable material onto the first motor portion.

8. The method of claim 1, in which the motor controllably positions a data transducer adjacent a storage medium.

9. The method of claim 1, in which the material comprises a polymer.

10. The method of claim 9 in which the polymer is fiber-reinforced.

* * * * *